(12) United States Patent
Ponomarenko (10) Patent No.: US 8,176,989 B1
(45) Date of Patent: May 15, 2012

(54) WHEELED SUPPORT FOR USING A TRIMMER AS A HAND-HELD LAWN EDGER

(76) Inventor: Valeriy Ponomarenko, Seattle, WA (US)

( * ) Notice: Subject to any disclaimer, the term of this patent is extended or adjusted under 35 U.S.C. 154(b) by 157 days.

(21) Appl. No.: 12/702,721

(22) Filed: Feb. 9, 2010

(51) Int. Cl.
*A01D 34/00* (2006.01)
(52) U.S. Cl. ............................... 172/17; 172/41
(58) Field of Classification Search ........... 172/13, 172/14, 15, 17, 41, 42
See application file for complete search history.

(56) References Cited

U.S. PATENT DOCUMENTS

| | | | | |
|---|---|---|---|---|
| 2,506,366 | A * | 5/1950 | Korn | 30/292 |
| 2,708,335 | A * | 5/1955 | Newton | 56/12.7 |
| 2,718,838 | A * | 9/1955 | Schumacher | 172/16 |
| 3,086,596 | A * | 4/1963 | Allegretti et al. | 172/15 |
| 3,788,049 | A * | 1/1974 | Ehrlich | 56/16.9 |
| 4,312,178 | A | 1/1982 | Callahan | |
| 4,364,435 | A * | 12/1982 | Tuggle et al. | 172/15 |
| RE32,266 | E * | 10/1986 | Tuggle et al. | 172/15 |
| 4,624,321 | A | 11/1986 | Pinto | |
| 4,679,385 | A * | 7/1987 | Carmine | 56/16.9 |
| 4,712,363 | A * | 12/1987 | Claborn | 56/16.7 |
| 4,756,148 | A * | 7/1988 | Gander et al. | 56/17.2 |
| 4,803,831 | A * | 2/1989 | Carmine | 56/16.9 |
| 4,914,899 | A * | 4/1990 | Carmine | 56/16.7 |
| 4,981,012 | A | 1/1991 | Claborn | |
| 5,065,567 | A | 11/1991 | Wessel et al. | |
| 5,383,330 | A | 1/1995 | Yokocho et al. | |
| 6,179,059 | B1 * | 1/2001 | Notaras et al. | 172/17 |
| 6,293,349 | B1 | 9/2001 | Marshall et al. | |
| 6,363,699 | B1 | 4/2002 | Wang | |
| 6,370,854 | B1 | 4/2002 | Moore | |
| 6,516,598 | B1 * | 2/2003 | Notaras et al. | 56/16.7 |
| 6,644,264 | B2 * | 11/2003 | Shoemaker | 123/198 R |
| 6,769,494 | B2 * | 8/2004 | Breneman et al. | 172/14 |
| 6,796,112 | B1 | 9/2004 | Price | |
| 2003/0047329 | A1 * | 3/2003 | Keane | 172/14 |
| 2005/0098328 | A1 * | 5/2005 | Popp | 172/17 |
| 2008/0230240 | A1 * | 9/2008 | Hurley | 172/14 |
| 2009/0188354 | A1 * | 7/2009 | Harris | 83/13 |

* cited by examiner

*Primary Examiner* — Robert Pezzuto
*Assistant Examiner* — Jamie L McGowan (57) ABSTRACT

A wheeled support adapts a trimmer to function as a lawn edger. Because there are various trimmers to which the wheel may be mounted, an adapter plate is provided that is configured to match a selected trimmer on which adapter plate the wheel may be mounted. A bearing is provided between the adapter plate and the wheel so the wheel rotates freely on a drive shaft of a trimmer powered drive independent of rotation of the drive shaft. A mounting plate mountable to the wheel is typically provided for convenience of mounting the bearing and adapter plate to the wheel with the bearing fitting within the adapter plate and over the mounting plate. A trimmer cutter, which may be either a flexible line dispenser or a blade, typically is mounted to the drive shaft outside the wheel after the drive shaft passes through the adapter plate, bearing, mounting plate and wheel, although the cutter may mount inside the wheel.

16 Claims, 7 Drawing Sheets

Fig. 8
PRIOR ART

WHEELED SUPPORT FOR USING A TRIMMER AS A HAND-HELD LAWN EDGER

BACKGROUND

1. Field of the Invention

This invention relates to lawn edgers, and more particularly to a flexible line trimmer with a wheeled support attached thereto that adapts the trimmer to function as a hand-held lawn edger.

2. Prior Art

Lawn edgers are common and widely used. It is also known to have a support for a lawn edger that positions the edger in a stable position over the edge of the lawn and moves the lawn edger on a wheel as the edger progresses along the lawn edge to keep the edger at its intended lawn trimming position. It is also known to have a flexible line trimmer adapted for use as a lawn trimmer with the trimmer supported on a wheeled support that is attached to the trimmer. The trimmer It is advantageous to support the edger at its head, that is, at the end its wand where the cutting blade or flexible line is driven, where the weight of the driving mechanism trimmer blade. The prior art discloses wheeled support apart from the head, "wheel barrow" style" but this still leaves the user lifting the head at the handle end of the wand. Also, a user will experience more precise control of the edger when the support wheel is coaxial with the cutting line or blade, providing support directly under the head.

Several patents have been granted for adapted trimmers, representative of which are U.S. Pat. No. 4,981,012, which discloses a bracket attached on its proximal end to the wand of a trimmer that supports the trimmer on a wheel on a distal end of the bracket. Also representative is U.S. Pat. No. 5,918,683 that discloses a bracket attached on its proximal end to the wand of a trimmer on a wheel rearward of its cutting blade and U.S. Pat. No. 5,383,330 that discloses a trimmer with primary support wheel rearward of a cutting blade and an auxiliary wheel coaxial with the blade axis that maintains the trimmer gear box above the ground.

It is therefore an object to provide a support wheel mountable to a trimmer coaxially with the cutting line or blade of the trimmer that converts the trimmer to a lawn edger and supports the edger at the trimmer head.

SUMMARY

This object is achieved in a wheel adapted to mount to a trimmer. Because there are various trimmers to which the wheel may be mounted, an adapter plate is provided configured to match a selected trimmer on which adapter plate the wheel may be mounted. A bearing is provided between the adapter plate and the wheel so the wheel rotates freely on a drive shaft of a trimmer powered drive independent of rotation of the drive shaft. A mounting plate mountable to the wheel is typically provided for convenience of mounting the bearing and adapter plate to the wheel with the bearing fitting within the adapter plate and over the mounting plate. A trimmer cutter, which may be either a flexible line dispenser or a blade, typically is mounted to the drive shaft outside the wheel after the drive shaft passes through the adapter plate, bearing, mounting plate and wheel, although the cutter may mount inside the wheel.

DETAILED DESCRIPTION OF THE PREFERRED EMBODIMENTS

Figure 8:
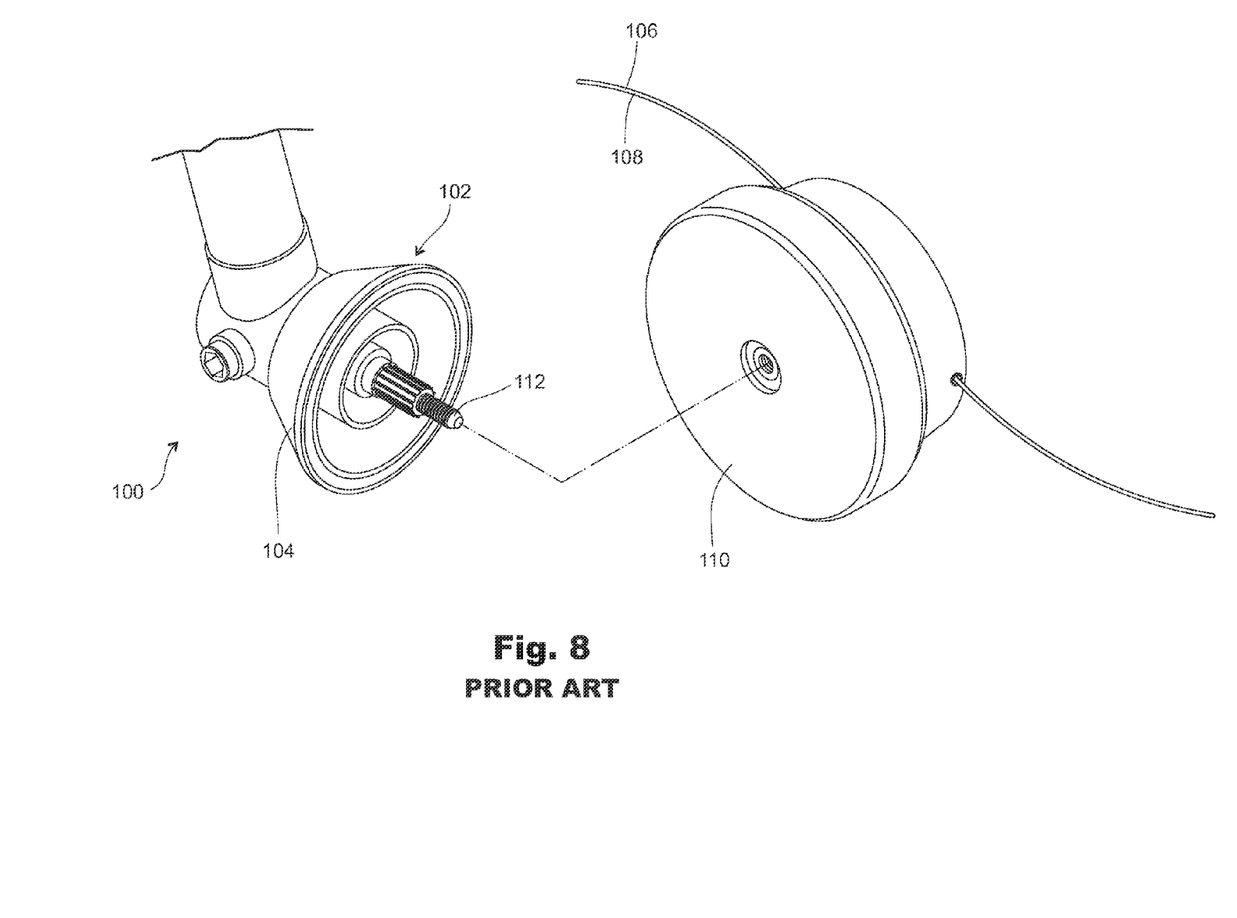
FIG. 8 is a perspective view of a flexible line trimmer drive of the prior art with its dispenser aligned for threading over a drive shaft of the drive.

Well-known widely available trimmers 100 of the prior art include a powered drive 102 within a housing 104 with a cutting member 106, either a blade or a flexible line 108 dispensed from a line dispenser 110, that is attachable to a drive shaft 112 of the powered drive 102. The wheeled support 10 of the present invention converts the trimmer 100 to a lawn edger.

Figure 1:
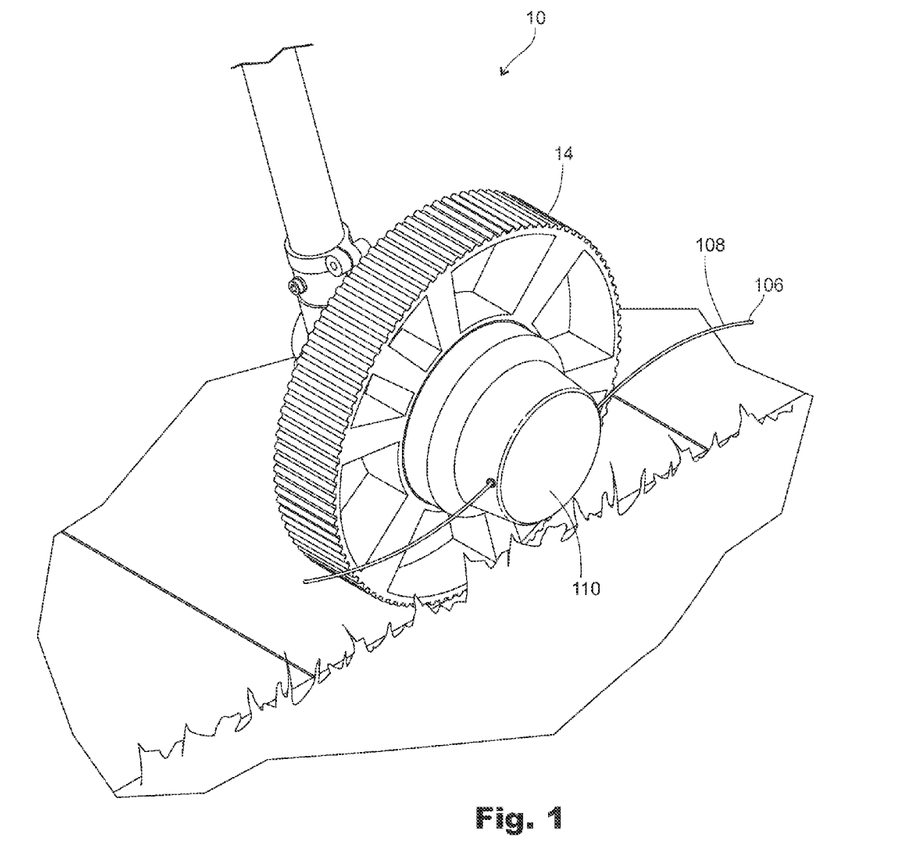
FIG. 1 is a front perspective view the lawn edger converted from a flexible line trimmer with a wheeled support coaxial with the flexible line dispenser.
Figure 2:
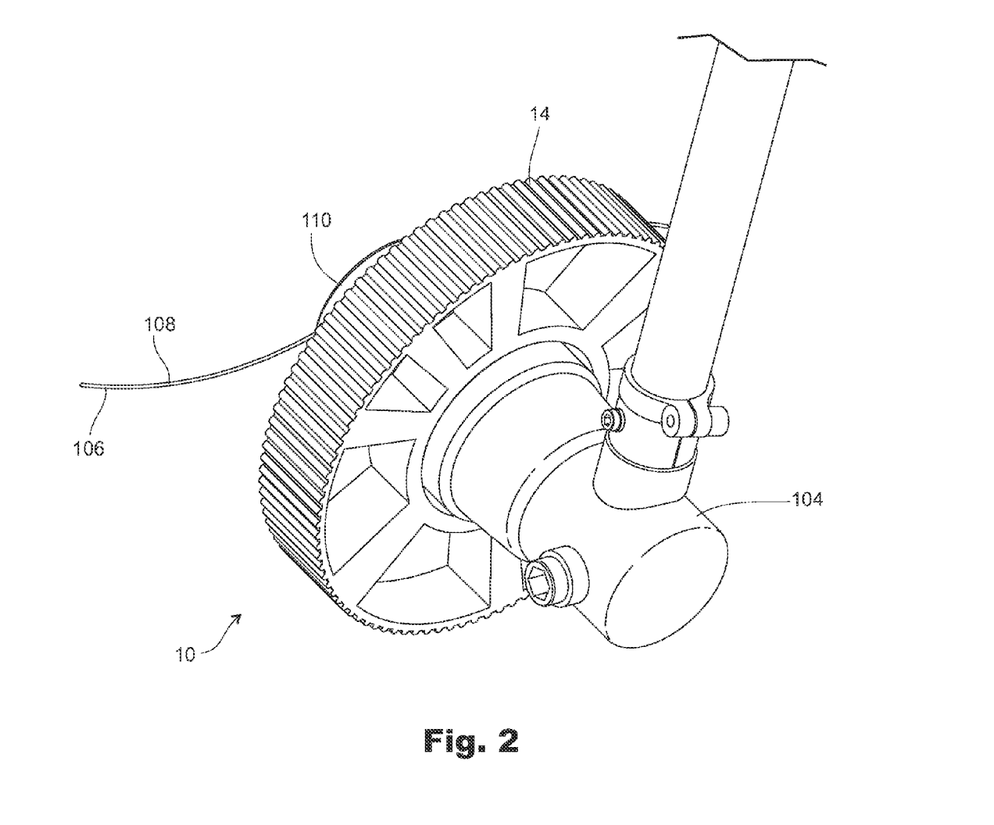
FIG. 2 is a back perspective view of the lawn edger of claim 1
Figure 3:
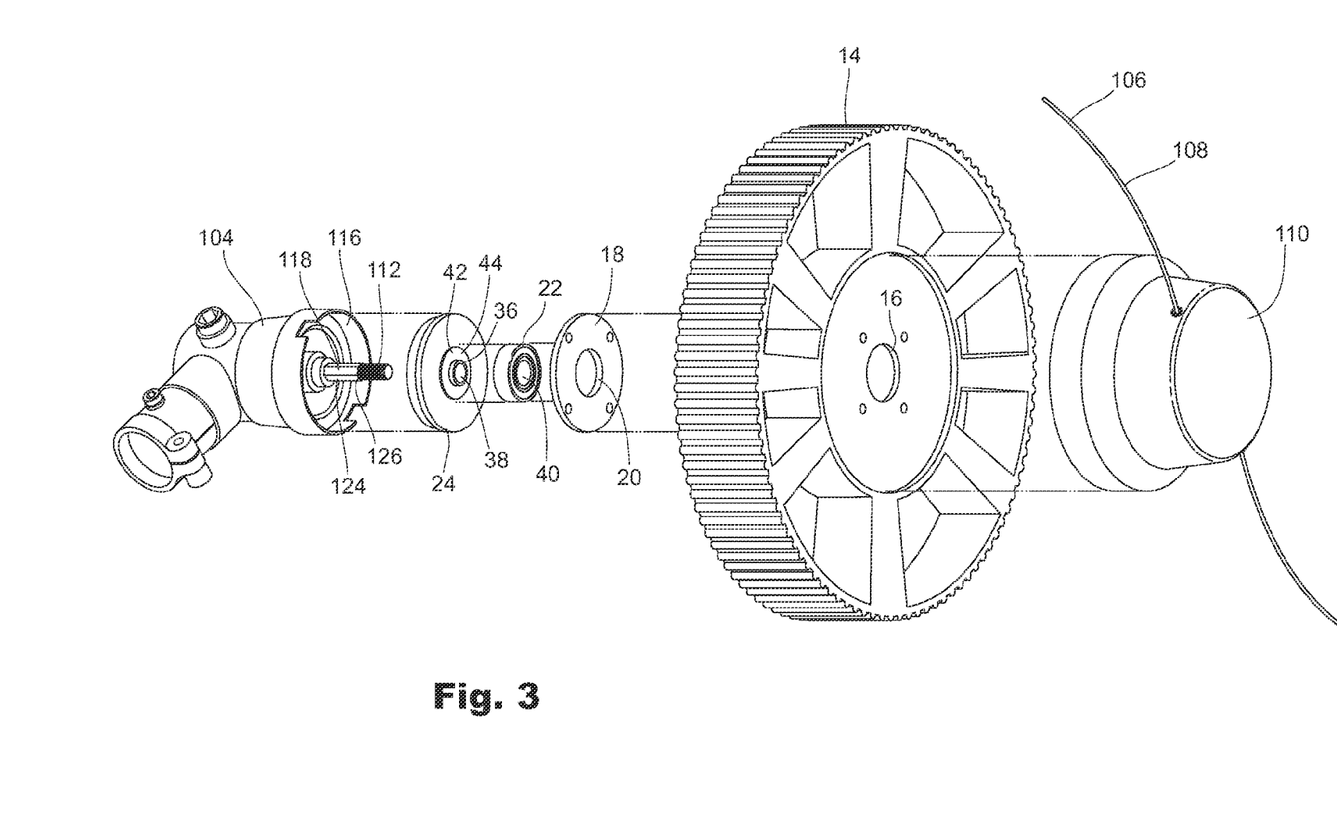
FIG. 3 is a front perspective exploded view of the lawn edger of FIG. 1 showing its assembly.

A wheel 14 is mountable coaxially over the trimmer drive shaft 112 of the powered drive 102 of the trimmer 100 and is sized to support the housing 104 above a surface on which the wheel 14 moves when in use. When the cutting element 106 is a flexible line 108 dispensed from the dispenser 110 that is mounted coaxially to the drive shaft 112, the wheel 14 is also sized to support the dispenser 110 above the surface on which the wheel 14 moves.

Figure 5:
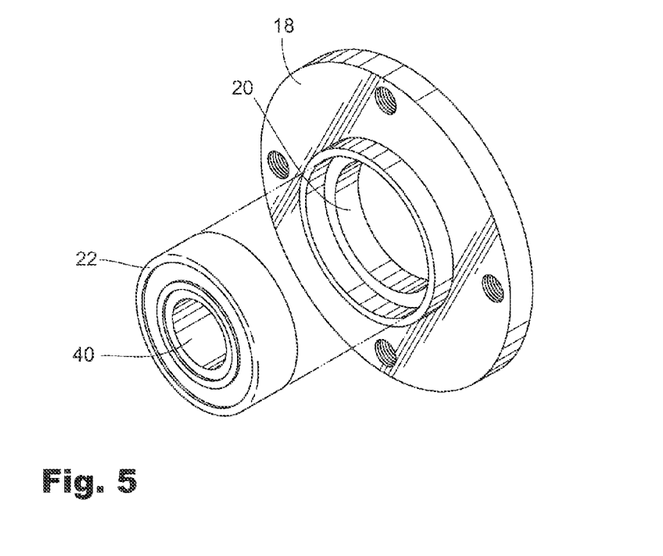
FIG. 5 is a back perspective view of the mounting plate for mounting the wheel to the adapter plate and the trimmer, shown with a bearing aligned for insertion into the back of the mounting plate.

The wheel 14 is mounted on the powered drive 102 such that it rotates freely on the drive shaft 112 independent of rotation of the drive shaft 112. The drive shaft 112 typically, but not necessarily, passes through an axial wheel hole 16 to receive attachment of the dispenser 110 with the wheel 14 between the powered drive 102 and the dispenser 110. Typically, a mounting plate 18 is mounted to the wheel 14 with a mounting plate center hole 20 coaxial with the wheel hole 16. A bearing 22 is installed in the mounting plate 18 between the axial wheel hole 16 and the drive shaft 112, or when a mounting plate 18 is employed, between the axial wheel hole 16 and the mounting plate center hole 20, enabling the wheel 14 to rotate freely on the drive shaft 112.

Figure 4:
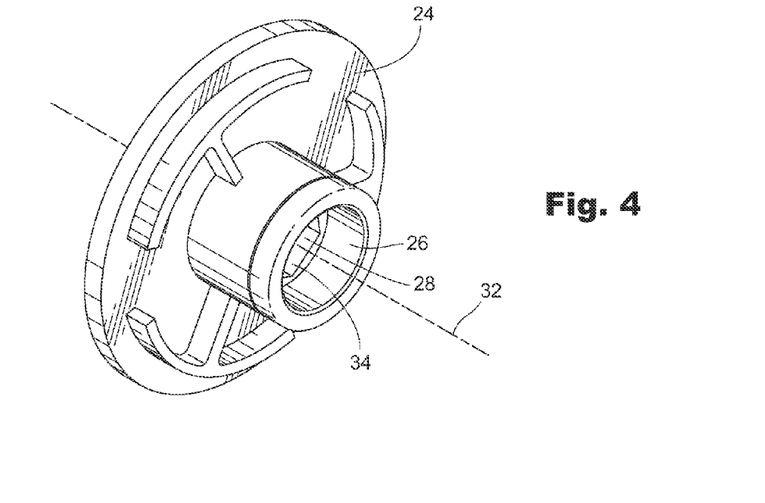
FIG. 4 is a back perspective view of the adapter plate configured to mount to a flexible line trimmer on its back side and to receive a mounting plate on its front side.
Figure 7:
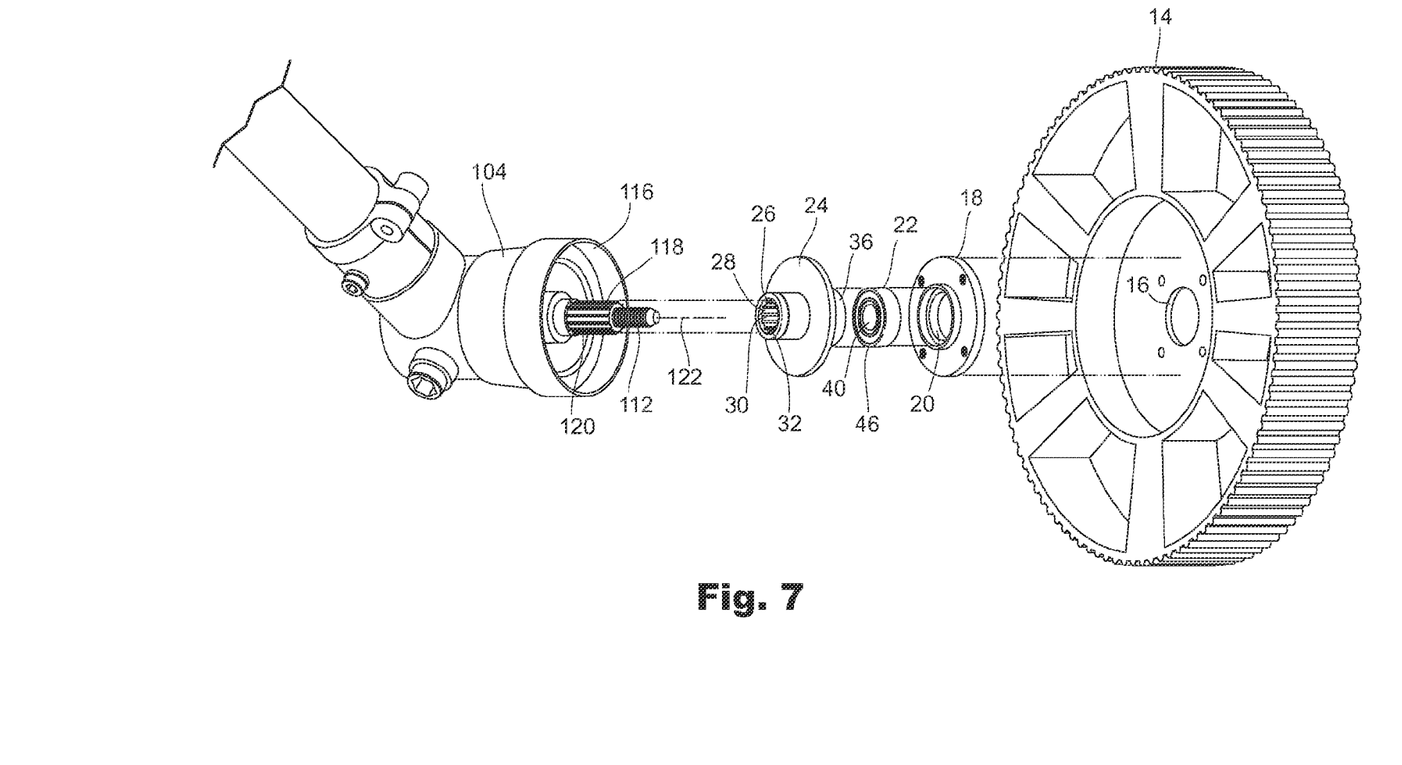
FIG. 7 is a perspective view of an alternate powered drive aligned for receiving a matching alternate adapter plate shown aligned to receive a bearing thereon and the mount plate aligned to receive the bearing therein with the mount plate aligned to be mounted to the wheel.

Typically, the powered drive 102 is provided with a trimmer housing cover plate (not shown) that effectively closes the front 116 of the housing 104 through which the drive shaft 112 passes and engages with the drive shaft 112 such that it rotates when the drive shaft 112 rotates. An adapter plate 24 is provided that is adapted to substitute for the cover plate. The adapter plate 24 also effectively closes the front 116 of the housing 104. The adapter plate 24 similarly is adapted to mount to the drive shaft 112 such that the adapter plate 24 rotates with the drive shaft 112. As with the cover plate, the adapter plate 24 includes an adapter center hole 26 therethrough with an adapter hole shaft engaging surface 28 around the adapter center hole 26 that is adapted to engage an uneven outer surface 118 of the drive shaft 112. Different suppliers may differ in the detail of how the cover plate engages the drive shaft 112, and the adapter plate 24 follows that detail to also achieve engagement between the adapter plate 24 and the drive shaft 112. Where the drive shaft 112 employs a plurality of drive shaft spines 120 on its circumference parallel to a longitudinal drive shaft axis 122, the adapter plate 24 includes an engaging surface 30 comprising a matching plurality of spines 32 parallel with an adapter plate center hole axis 32 such that when the drive shaft 112 rotates the adapter plate 24 also rotates. Where the drive shaft 112 employs at least one flat surface 124 on its circumference, such as a hexagonal circumference 126, the adapter plate 24 includes an engaging surface that comprises a matching at least one flat surface 34 about the adapter center hole 26, such that when the drive shaft 112 rotates the adapter plate 24 rotates. Clearly, the wheel can be attached to other powered drives by matching the adapter plate engaging surface 30 to the drive shaft.

Figure 6:
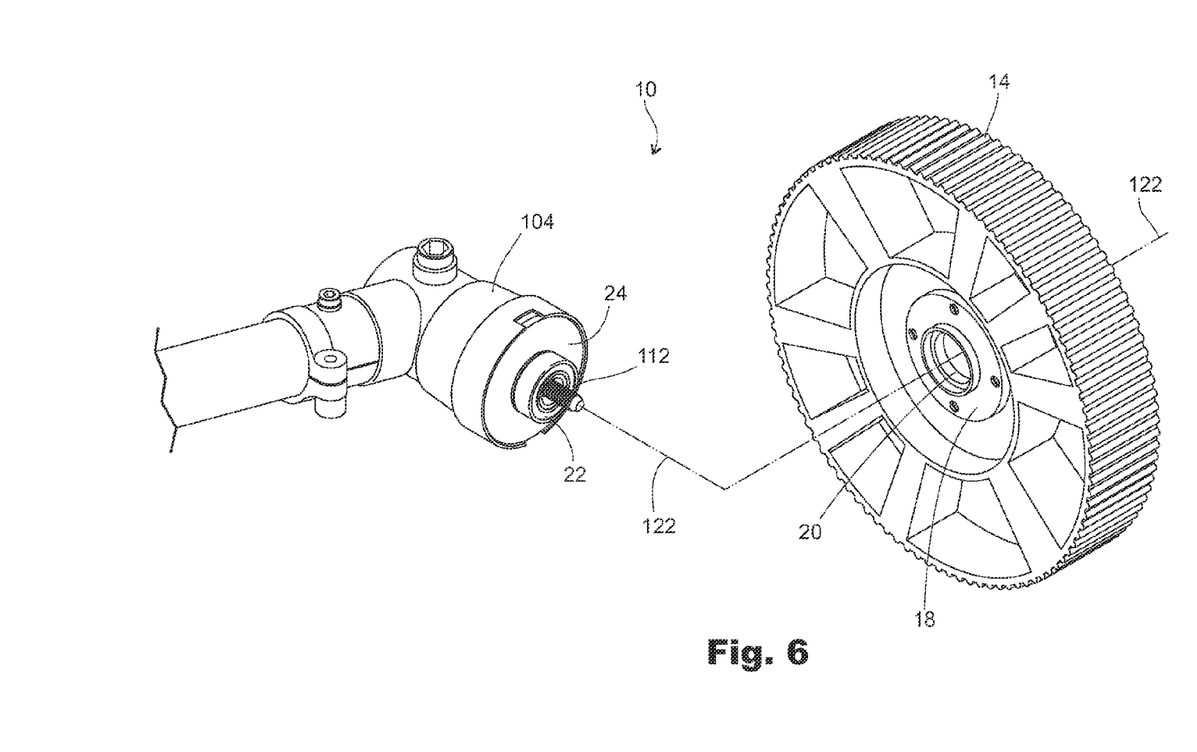
FIG. 6 is a perspective view of the adapter plate with the bearing installed thereon mounted to the powered drive and also showing a wheel with mount plate attached thereto aligned for mounting over the bearing.

The adapter plate 24 further comprises a first cylinder 36 extending axially, that is coaxial with the drive shaft 112, when the adapter plate 24 is mounted on the drive shaft 112 with a first cylinder axial hole 38 therethrough extending the adapter plate center hole 26 through which the drive shaft 112 may pass. The wheel 14 is mountable to the first cylinder. The bearing 22 is installed between the axial wheel hole 16, which sized to receive the bearing 22 therein, and the first cylinder 36. More typically in implementation, the first cylinder 36 extends through a bearing center hole 40 and the bearing 22 is received into the mounting plate 18, which is secured over in the axial wheel hole 16. The adapter plate 24 further comprises a second cylinder 42 coaxial with the first cylinder 36 and is larger than the first cylinder 36 with the first cylinder 36 extending coaxially from the second cylinder 42. The second cylinder 42 is sized in diameter such that a second cylinder end 44 from which the first cylinder 36 extends receives a bearing end 46 in face to face abutment as the first cylinder 36 extends into the bearing center hole 40.

Having described my invention, I claim the following:

1. A wheeled support adapted to convert a trimmer to a lawn edger where the trimmer includes a powered drive within a housing with a cutting member attachable to a drive shaft of the powered drive, comprising: a wheel mountable coaxially over a drive shaft of the drive of the trimmer with the drive shaft passing through an axial wheel hole to receive attachment of the cutting member wherein the wheel is mounted such that it rotates freely on the drive shaft independent of rotation of the drive shaft, an adapter plate mountable to the drive shaft such that the adapter plate rotates with the drive shaft, the adapter plate comprising a first cylinder extending axially that is coaxial with the drive shaft when mounted thereon with an axial hole therethrough extending the adapter plate center hole through which the drive shaft may pass, the wheel mountable to the first cylinder and further comprising a bearing installed between the axial wheel hole and the first cylinder such that the wheel rotates freely on the first cylinder independent of rotation of the adapter plate and the drive shaft when the adapter plate is mounted on the drive shaft.

2. The wheeled support of claim 1 wherein the wheel is sized to support the housing above a surface on which the wheel moves when in use.

3. The wheeled support of claim 1 wherein the cutting element is a flexible line dispensed from a dispenser mounted coaxially to the drive shaft and the wheel is sized to support the dispenser above a surface on which the wheel moves when in use.

4. The wheeled support of claim 1 further comprising a bearing installed between the axial wheel hole and the drive shaft enabling the wheel to rotate freely on the drive shaft.

5. The wheeled support of claim 4 further comprising a mounting plate mounted to the wheel and having a mounting plate center hole coaxial with the wheel hole adapted to receive the bearing therein.

6. The wheeled support of claim 1 wherein the adapter plate is adapted to substitute for a trimmer housing cover plate provided with the trimmer through which the drive shaft passes and mounted to the drive shaft such that the cover plate effectively closes a front of the housing, the adapter plate effectively closing the front of the housing.

7. The wheeled support of claim 6 wherein the adapter plate includes a center hole therethrough with an adapter hole shaft engaging surface around the center hole that is adapted to engage an uneven outer surface of the drive shaft.

8. The wheeled support of claim 7 wherein the engaging surface comprises a plurality of spines parallel with a center hole axis adapted to engage a matching plurality of drive shaft spines such that when the drive shaft rotates the adapter plate rotates.

9. The wheeled support of claim 7 wherein the engaging surface comprises at least one flat surface on its circumference adapted to engage a matching at least one flat surface on the drive shaft such that when the drive shaft rotates the adapter plate rotates.

10. The wheeled support of claim 1 wherein the adapter plate comprises a second cylinder coaxial with the first cylinder and larger than the first cylinder, the first cylinder extending from the second cylinder, the second cylinder being sized in diameter with a second cylinder end from which the first cylinder extends adapted receive a bearing end in face to face abutment as the first cylinder extends through a bearing center hole and wherein the axial wheel hole is sized to receive the bearing therein.

11. A wheeled support adapted to convert a trimmer to a lawn edger where the trimmer includes a powered drive within a housing with a cutting member attachable to a drive shaft of the powered drive, comprising: a wheel mountable coaxially over a drive shaft of the powered drive of the trimmer with the drive shaft with the cutting element also attached to the drive shaft, wherein the wheel is mounted such that it rotates freely on the drive shaft independent of rotation of the drive shaft wherein the wheel is sized to support the housing above a surface on which the wheel moves when in use, an adapter plate mountable to the drive shaft such that the adapter plate rotates with the drive shaft, the adapter plate effectively closing a front of the housing from which the drive shaft extends, wherein the adapter plate includes a center hole therethrough with an adapter hole shaft engaging surface around the center hole that is adapted to engage an uneven outer surface of the drive shaft such that the adapter plate rotates with the drive shaft when the adapter hole shaft engaging surface is engaged with the uneven surface of the drive shaft, wherein the adapter plate comprises a first cylinder extending therefrom coaxial with the drive shaft when mounted thereon with an axial hole therethrough through which the drive shaft may pass, the wheel mountable to the first cylinder and further comprising a bearing installed between the axial wheel hole and the first cylinder such that the wheel rotates freely on the first cylinder independent of rotation of the adapter plate and the drive shaft when the adapter plate is mounted on the drive shaft.

12. The wheeled support of claim 11 wherein the cutting element is a flexible line dispensed from a dispenser mounted coaxially to the drive shaft.

13. The wheeled support of claim 11 further comprising a bearing installed between the axial wheel hole and the drive shaft enabling the wheel to rotate freely on the drive shaft.

14. The wheeled support of claim 13 further comprising a mounting plate mounted to the wheel and having a mounting plate center hole coaxial with the wheel hole adapted to receive the bearing therein.

15. The wheeled support of claim 11 wherein the adapter hole engaging surface comprises a plurality of spines parallel with a center hole axis adapted to engage a matching plurality of drive shaft spines such that when the drive shaft rotates the adapter plate rotates.

16. The wheeled support of claim 11 wherein the engaging surface comprises at least one flat surface on its circumference adapted to engage a matching at least one flat surface on the drive shaft such that when the drive shaft rotates the adapter plate rotates.

* * * * *